March 28, 1967 J. E. MARTENS 3,311,413
HEADREST POSITIONING MECHANISM
Filed July 17, 1964 2 Sheets-Sheet 1
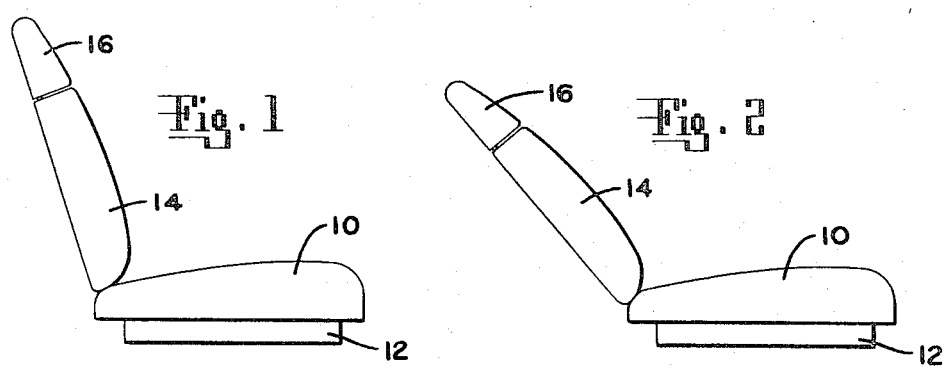
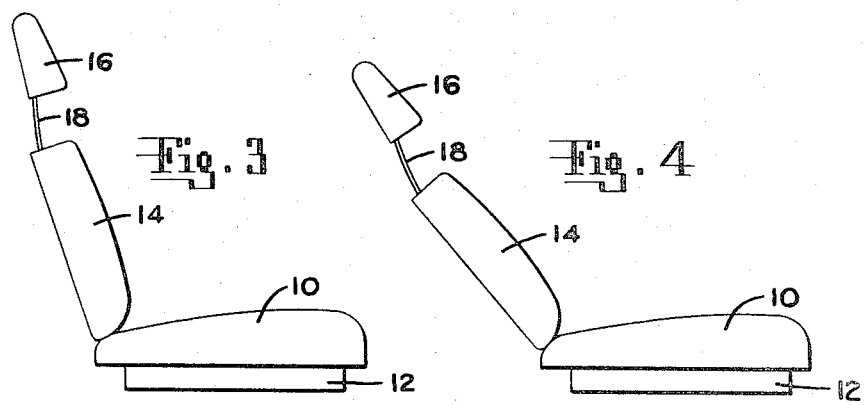
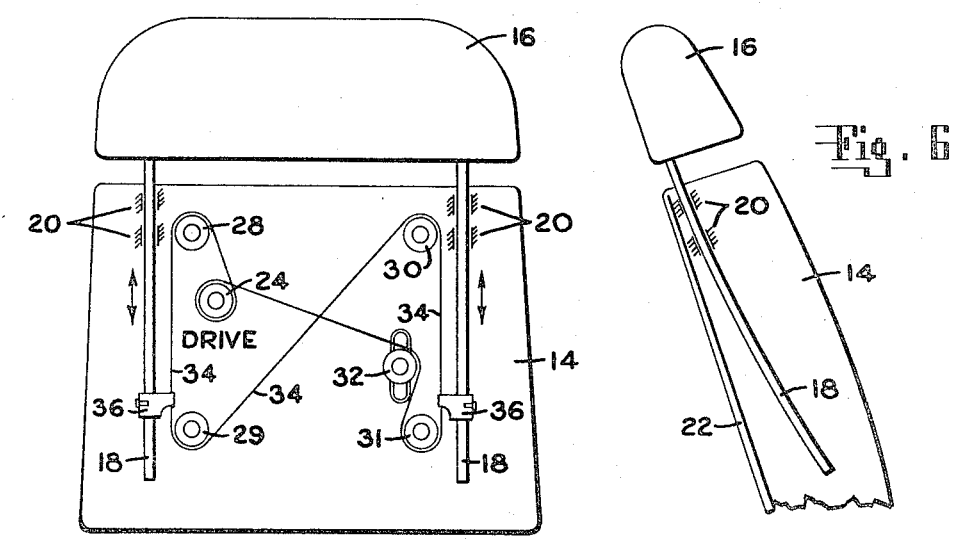
INVENTOR.
JACK E. MARTENS
BY Kenneth E. Walden March 28, 1967 J. E. MARTENS 3,311,413
HEADREST POSITIONING MECHANISM
Filed July 17, 1964 2 Sheets-Sheet 2
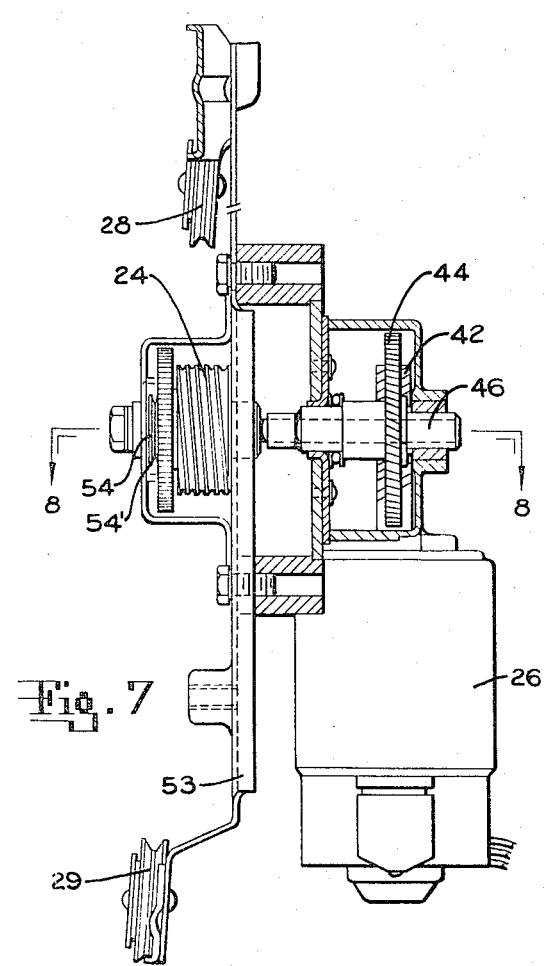
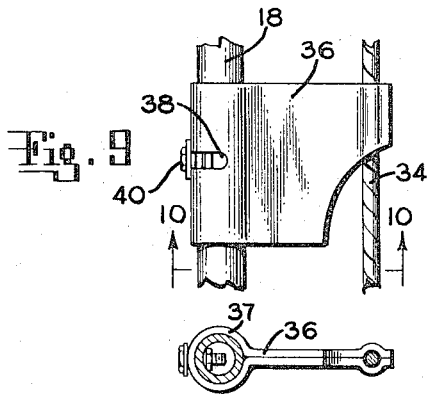
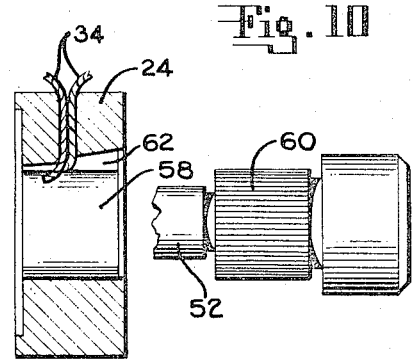
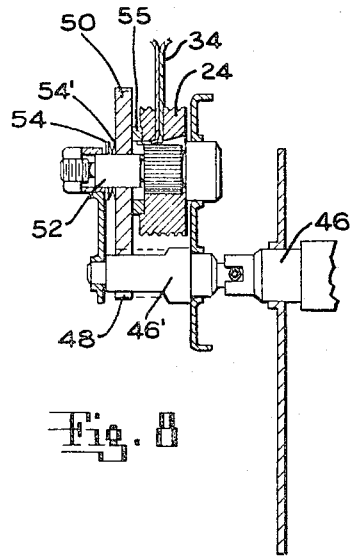
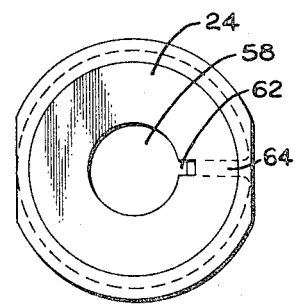
INVENTOR.
JACK E. MARTENS
BY United States Patent Office 3,311,413
Patented Mar. 28, 1967

3,311,413
HEADREST POSITIONING MECHANISM
Jack E. Martens, Bloomfield Hills, Mich., assignor to The Anderson Company, a corporation of Indiana
Filed July 17, 1964, Ser. No. 383,438
6 Claims. (Cl. 297—410)

This invention relates to a headrest for an automobile seat and is particularly concerned with a drive mechanism for selectively positioning the headrest in an infinite number of positions above the seat back on which it is supported.

In automobile seats having positionable or adjustable backs, it is desirable that the backs be provided with a headrest to support the seat occupant, particularly when the back is reclined.

An object of this invention is to provide an improved mechanism for raising and lowering a headrest.

Another object of this invention is to provide a method of attaching a cable to a drum or sheave.

Other objects and advantages of the invention will become apparent after the description hereinafter set forth is considered in conjunction with the drawings annexed hereto.

In the drawings:

FIGURES 1 through 4 show a seat having a reclinable back and headrest in various positions; FIGURE 1 shows the back in an upright position with the headrest lowered; FIGURE 2 shows the back in a reclined position with the headrest lowered; FIGURE 3 shows the back in an upright position with the headrest raised; and, FIGURE 4 shows the seat back reclined with the headrest raised;

FIGURE 5 shows the mechanism for raising and lowering the headrest as viewed from the rear of the seat;

FIGURE 6 is a side view of the seat shown in FIGURE 5, disclosing supporting rods for the headrest, but omitting the drive mechanism for clarity;

FIGURE 7 shows a drive motor, gear reduction and drum;

FIGURE 8 is a sectional view of FIGURE 7 at reduced scale taken substantially along line 8—8, and showing the drum and cable-attaching means;

FIGURE 9 shows structure for connecting cables and headrest rods;

FIGURE 10 is a sectional view taken substantially along line 10—10 of FIGURE 9;

FIGURE 11 shows the drum spaced from a shaft on which it is to be assembled;

FIGURE 12 is a side view of the drum; and

FIGURE 13 is a side view of the drum shown in FIGURE 12.

In FIGURES 1 through 4, numeral 10 designates an automobile seat which is supported on a base 12. Positionable back 14 is pivotally carried on base 12 and provided with means (not shown) for adjusting and holding the back in any desired position. Headrest 16 is carried on back 14 and is adapted to be vertically positioned therefrom. Headrest 16 has depending rods 18 which are slidably received in back 14. Mechanism is provided within back 14 and connected to rods 18 for raising and lowering the headrest in either direction.

Back 14 is provided with bearing means 20 for slidably receiving rods 18 therethrough. A frame 22 provides the main support for seat 14 and is adapted to carry mechanism for raising and lowering, as well as carrying, the headrest. This mechanism may be directly attached to frame 22, or provided with a frame of its own which in turn is attached to frame 22.

In FIGURE 5, a plurality of pulleys is so arranged with a cable spaced thereabout that opposite sides or reaches of the cable travel in the same parallel direction upon selective rotation of the drive mechanism. A driving drum 24 is adapted to be driven in either direction by a reversible motor 26. Four idler pulleys designated 28, 29, 30 and 31 are spaced about driving drum 24 and mounted either directly or indirectly on frame 22. An adjustable pulley 32 is provided on frame 22 or on a separate frame for vertical adjustment to remove slack from encircling cable 34. Cable 34 is attached to driving drum 24 and is disposed about the several pulleys as disclosed in FIGURE 5 so that opposite reaches of the cable lie substantially parallel and adjacent the parallel rods 18 of the headrest. Connecting means 36 in the form of a hinge connects rods 18 with cables 34 at portions defining the parallel reaches. Movement of cables 34 moves rods 18.

As shown in FIGURES 9 and 10, connecting means 36 is provided at one end with a loop portion 37 adapted to be received over rods 18 to pivot with respect thereto. Another portion clamps the cable 34 in holding relationship. An arcuate slot 38 is provided in loop portion 37 and is adapted to receive therethrough a screw or pin 40 affording a connection for moving the rod 18 in either linear direction, but at the same time permitting the hinge to pivot about rod 18. The reason for this will be explained more fully hereinafter.

FIGURE 7 shows a drive mechanism which comprises a reversible motor 26 driving through worm 42 to worm gear 44, then through shaft 46, 46' to gear 48 and to gear 50 carried on shaft 52 for driving drum 24. Pulleys 28 and 29 are carried by frame 53, which also supports the motor and gear reduction unit. A pair of flexible discs 54, 54' are disposed adjacent gear 50, which in conjunction with friction member 55, define a slip clutch. The provision of a slip clutch in this mechanism is to prevent injury to a seat occupant should his arm or hand be caught under the headrest when it is being lowered by the power mechanism.

Drum 24 is preferably provided with helical grooves 46 about its periphery for receiving cable 34. Bore 58 of the drum is adapted to be received over a cylindrical portion 60 of shaft 52. Portion 60 may be serrated or splined for forced engagement with the walls of bore 58 for establishing a secure connection therebetween. A keyway 62 is provided in drum 24 adjacent bore 58. The keyway may be straight, however, it is shown with a taper in FIGURES 11 and 13. A radial hole 64 is provided between the keyway and the periphery of the drum. This hole is large enough to receive therethrough a pair of cables 34. The shaft need not be in the form disclosed in FIGURE 11. For example, the drum may be placed on a plain shaft with equal results.

A flexible cable such as 34 is effectively secured to the drum by inserting an end of the cable from the drum periphery through opening 64 so that an ends extends into keyway 62. The drum is then inserted over shaft portion 60 of shaft 52 so that cable ends are wedged between portion 60 and keyway 62. The term "keyway," as used herein, is descriptive of a recess adjacent the bore and is not primarily meant to receive a key for securing the drum to the shaft to prevent relative rotation. However, an additional key and keyways may serve this purpose. By arrangement herein disclosed, it is apparent that an end or ends of cable 34 can be effectively secured to drum 24. The endless loop formed in the rest of the cable may then be positioned about idler pulleys in a manner disclosed in FIGURE 5.

Rods 18, as shown, are provided with a curvature so as to position the headrest forwardly as it is raised from seat back 14. FIGURE 6 shows rods of such curvature and it will be readily apparent that a hinge 36 may freely pivot around rod 18 as the rod is driven by rectilinear motion of cable 34. Straight line motion of the cable is transmitted to curvilinear motion of the rods.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:
1. In a seat having a back,
a headrest,
said headrest having a pair of depending spaced-apart parallel rods slidably receivable in said back,
drive mechanism adapted to be carried by said back for selectively positioning said headrest with respect to said back,
said drive mechanism comprising a reversible motor for driving a drum in either direction, a plurality of spaced pulleys, and an endless cable connected to said drum and drivingly encircling said pulleys,
opposed parallel reaches formed by said cable disposed adjacent said rods and driven in the same general direction,
means pivotally carried by said rods connected with said movable reaches whereby selective rotation of said motor positions said headrest relative to said back.

2. In a seat having a back,
a headrest positioned atop said back and adapted to be raised and lowered with respect thereto,
said headrest having a pair of spaced-apart curvilinear substantially parallel rods slidably received in said back,
drive mechanism carried by said back for positioning said headrest whereby the curvature of said rods causes the headrest to move forwardly as it is moved upwardly,
said drive mechanism comprising a reversible motor for driving a drum in either direction, a plurality of spaced-apart pulleys with an endless cable carried therearound and drivingly connected to said drum,
opposed portions of said cable defining parallel reaches and adapted for traveling in the same direction and disposed adjacent said curvilinear rods,
and means flexibly connecting said parallel cable reaches and curvilinear rods whereby rectilinear movement of said reaches is transmitted to curvilinear movement of said headrest.

3. A method of connecting a cable to a drum comprising the steps of:
forming a bore and keyway in the drum,
forming an opening radially from the keyway to the drum periphery,
inserting a cable from the drum periphery through the opening with a portion extending into the keyway,
passing a shaft into the bore of the drum and holdingly entrapping the cable portion between the shaft and keyway.

4. The method of claim 3 wherein the keyway is formed at an incline with respect to the bore.

5. A method of connecting a flexible cable to a drum which drum is already provided with a bore and keyway comprising the steps of:
forming an opening from the keyway to the periphery of the drum,
inserting a flexible cable from the drum periphery through the opening and allowing a portion of the cable to extend into the keyway,
inserting a shaft into the bore and wedging the cable portion between the periphery of the shaft and the keyway.

6. In a seat having a back,
a headrest positioned atop said back and adapted to be raised and lowered with respect thereto,
said headrest having a pair of spaced-apart curvilinear substantially parallel rods slidably received in said back,
drive mechanism carried by said back for positioning said headrest whereby the curvature of said rods causes the headrest to move forwardly as it is moved upwardly,
said drive mechanism comprising a reversible motor for driving a drum in either direction, a plurality of spaced-apart pulleys with an endless cable carried therearound and drivingly connected to said drum,
opposed portions of said cable defining parallel reaches and adapted for traveling in the same direction and disposed adjacent said curvilinear rods,
said parallel reaches and said curvilinear rods lying at varying distances from each other,
and means hingedly carried on said curvilinear rods and connected to said cable reaches to compensate for said varying distances for transmitting straight line movement from said reaches to curvilinear movement of said headrest.

References Cited by the Examiner
UNITED STATES PATENTS

| | | | |
|---|---|---|---|
| 2,558,468 | 6/1951 | Stovern | 33—80 |
| 2,796,918 | 6/1957 | Lockhardt | 297—410 |
| 2,805,479 | 9/1957 | Droste | 33—80 |
| 2,947,347 | 8/1960 | Spound | 297—410 |
| 2,985,229 | 5/1961 | Shamblin | 297—410 |
| 3,027,194 | 3/1962 | Rumptz | 297—410 |

FRANK B. SHERRY, *Primary Examiner.*

CASMIR A. NUNBERG, *Examiner.*